United States Patent [19]
Grewe et al.

[11] Patent Number: 5,076,736
[45] Date of Patent: Dec. 31, 1991

[54] CORNER ASSEMBLY FOR DISPLAY APPARATUS

[75] Inventors: Ronald E. Grewe, Novi, Mich.; Palle L. Jensen, Copenhagen, Denmark

[73] Assignee: Marketing Displays, Inc., Farmington Hills, Mich.

[21] Appl. No.: 223,836

[22] Filed: Jul. 25, 1988

[51] Int. Cl.$^5$ ............................................. F16B 7/00
[52] U.S. Cl. ................................. 403/295; 403/205; 403/402
[58] Field of Search ............... 403/401, 402, 403, 205, 403/295; 40/152, 156

[56] References Cited

U.S. PATENT DOCUMENTS

| | | |
|---|---|---|
| 3,328,878 | 7/1967 | Engineer . |
| 3,912,407 | 10/1975 | Heininger . |
| 4,205,486 | 6/1980 | Guarnacci ............... 403/295 X |
| 4,348,127 | 9/1982 | Hays, Jr. . |
| 4,356,648 | 11/1982 | Beaulieu ............... 40/152 X |
| 4,477,990 | 10/1984 | Buchanan ............... 40/152 X |
| 4,636,105 | 1/1987 | Johansson ............... 403/403 X |
| 4,702,638 | 10/1987 | Zalesak ............... 403/401 X |
| 4,725,083 | 2/1988 | Schauer ............... 403/295 X |

FOREIGN PATENT DOCUMENTS

| | | | |
|---|---|---|---|
| 7610404 | 3/1978 | Netherlands | ............ 403/295 |
| 2102094 | 1/1983 | United Kingdom . | |

Primary Examiner—Andrew V. Kundrat
Attorney, Agent, or Firm—Brooks & Kushman

[57] ABSTRACT

An improved display apparatus includes at least two elongated frame members arranged with ends thereof disposed generally adjacent one another in order to define an angulated frame corner configuration. Such frame members include elongated channel portions thereon, and an improved corner assembly according to the present invention includes a corner insert insertable between the generally adjacent ends of the frame members, and a corner key member for reinforcing and securely supporting the corner insert. The corner insert is attached to the corner key member, and the corner key member is attached to the frame members. The corner key member is preferably a continuous member, having a pair of corner legs disposed at an angulated relationship with one another, with each of the corner legs being receivable within the channel portion on one of the frame members and extending longitudinally therein.

33 Claims, 3 Drawing Sheets

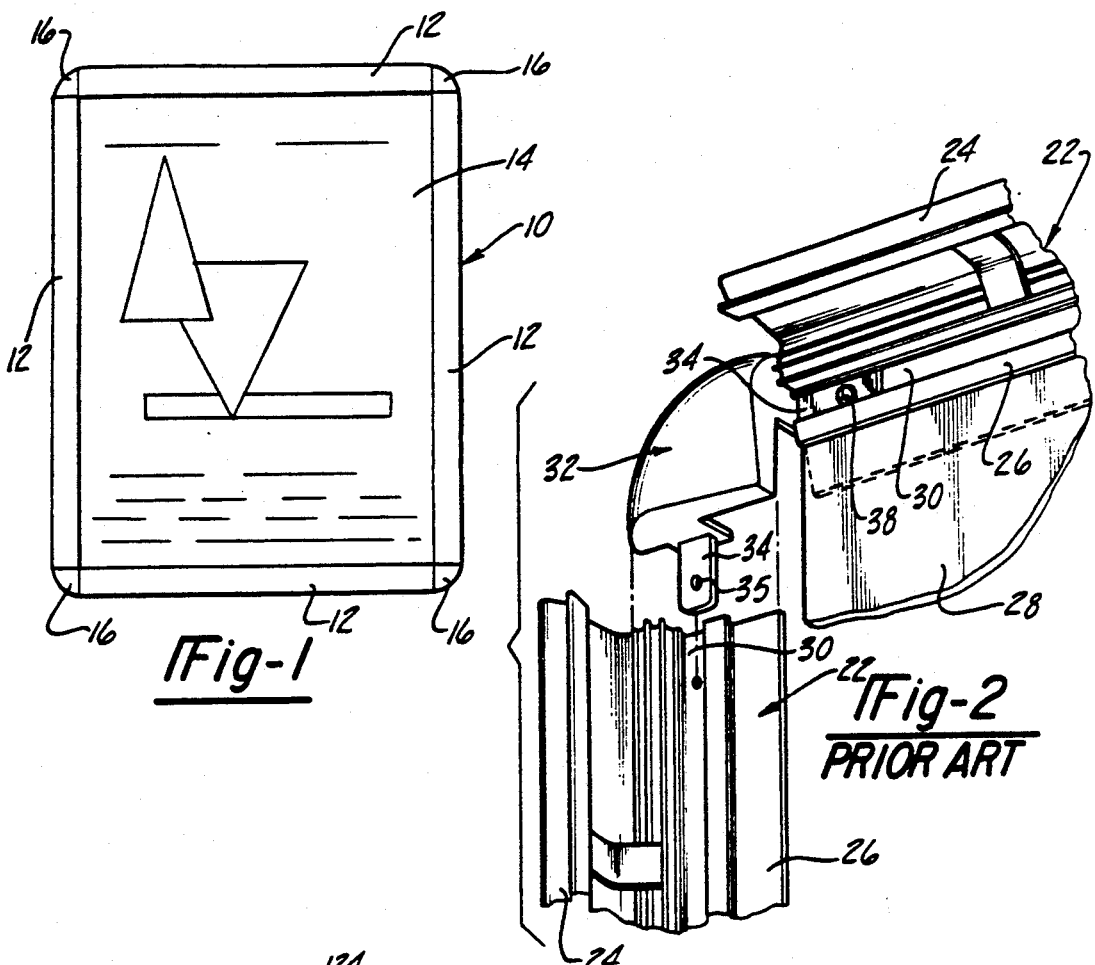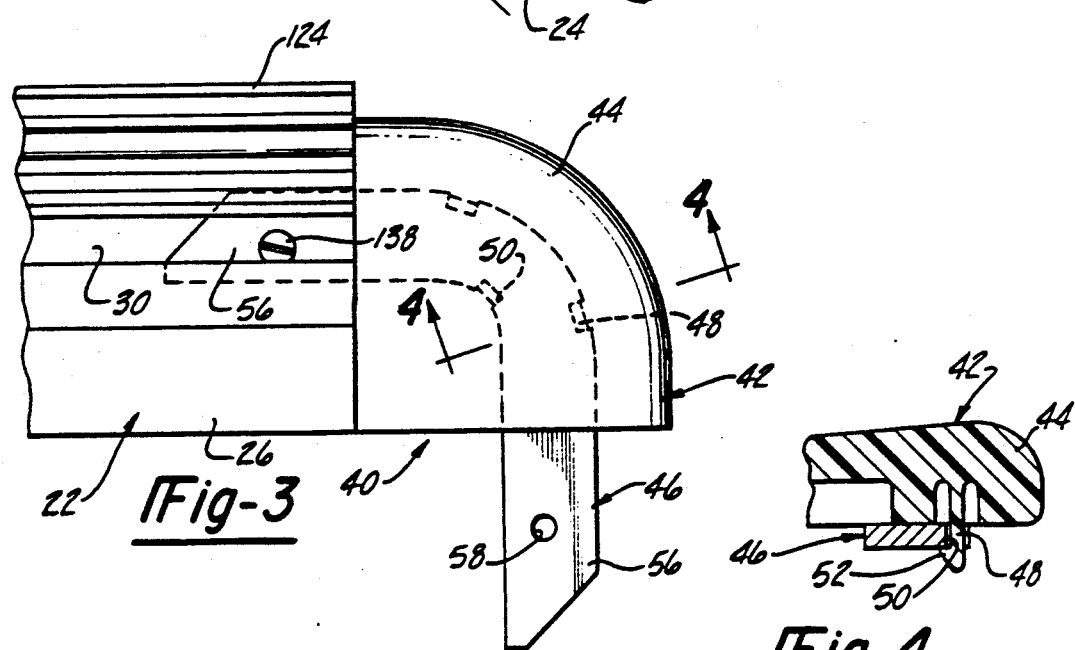

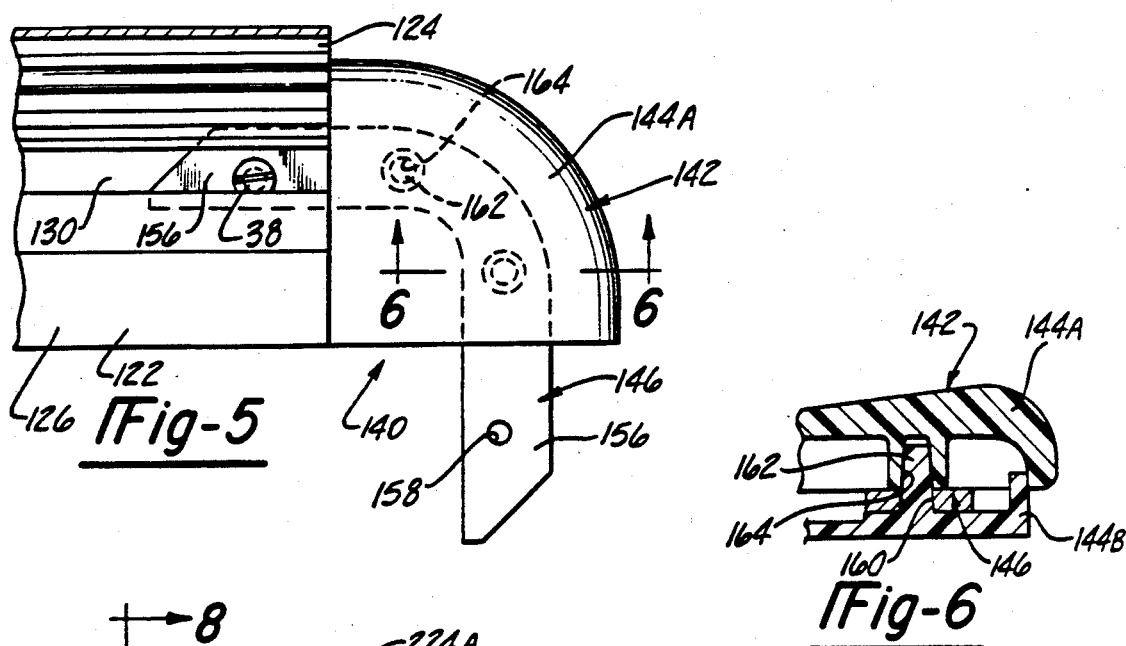
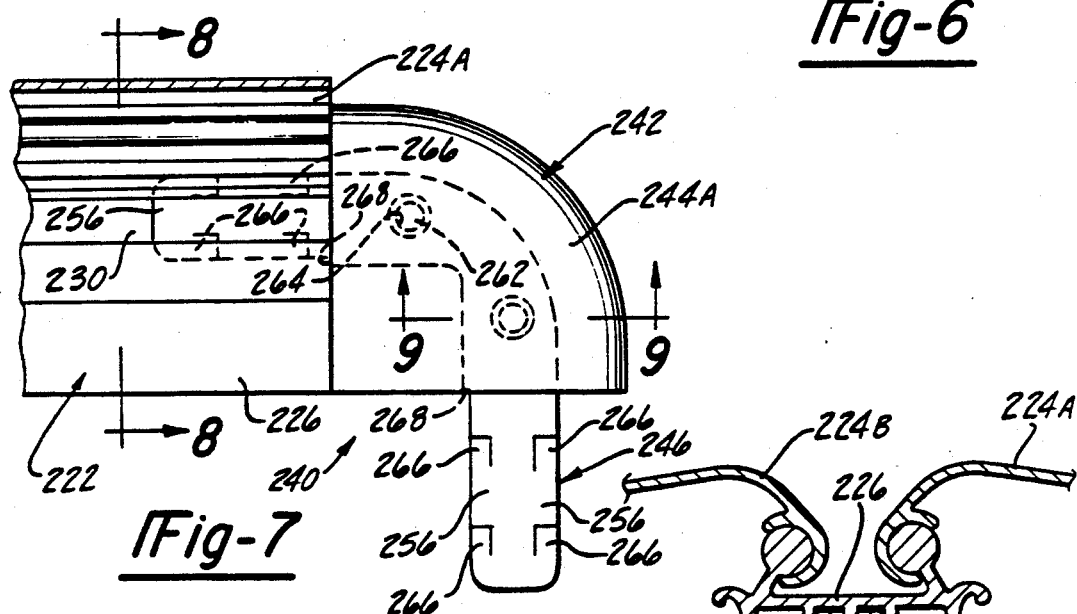
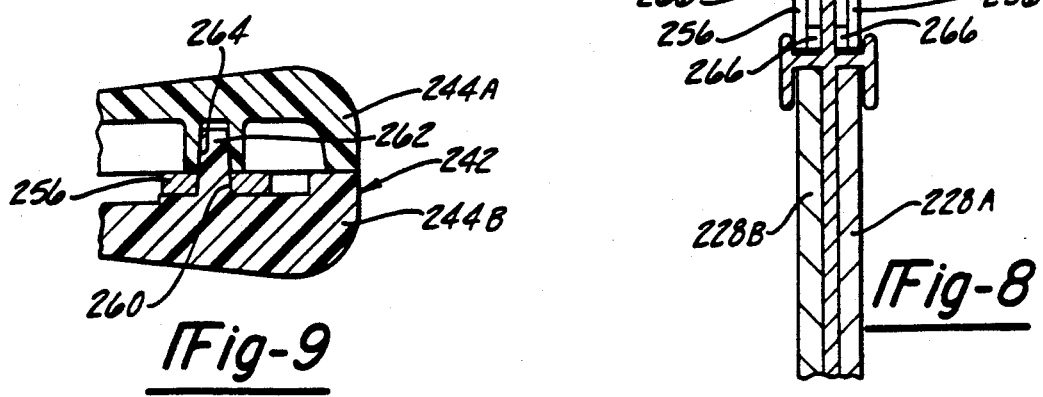

CORNER ASSEMBLY FOR DISPLAY APPARATUS

BACKGROUND AND SUMMARY OF THE INVENTION

The present invention relates generally to assemblies for forming a corner configuration in a display apparatus having a number of frame members with adjacent ends positioned to form an angulated corner. More specifically, the present invention relates to a corner insert assembly for filling a gap between the adjacent elongated frame members at an angulated corner portion thereof.

Various display apparatuses having elongated frame members for displaying a poster or sign have been provided in the prior art. Some examples of such display apparatuses can be found in U.S. Pat. Nos. 4,145,828, 4,512,094, 4,512,095, 4,519,152, and 4,523,400, for example, which are hereby incorporated by reference.

Frequently, it has been found to be desirable to provide an aesthetically up-scaled corner assembly having a particular configuration, such as a rounded or radiused corner for the frame portion of the display apparatus. Such a corner assembly or apparatus replaces the commonly-found mitered corners at corner locations where adjacent frame members meet. Thus, corner insert members composed of plastics or other such materials have been provided and have been equipped with integral plastic legs protruding at an angulated relationship with one another, with the legs on the corner insert members being insertable in channel portions on the adjacent frame members.

Although the corner insert members described above have performed relatively well, and have provided an improved aesthetic appearance, it has been found that in many cases, such integrally-formed leg portions of these corner insert members are susceptible to breakage when the display apparatus is dropped or handled roughly during assembly, transportation, or installation. In addition, in many instances the display apparatus must be suitable to be viewed for displaying a poster or sign from either side of the display. In such cases, the corner insert members described above have frequently been found to be undesirable due to the presence of visible fasteners securing the leg portions of the corner insert member to the adjacent frame members. Thus, the need has arisen for a stronger, reinforced corner insert member or assembly that is conveniently and inexpensively manufactured and assembled, and which is more resistent to impact or rough handling. In addition, the need has arisen for such a corner insert assembly that employs no visible fastening means such that the display apparatus is suitable for being viewed from either side, thus allowing greater display exposure and the capability for displaying different messages on each side of the display apparatus.

An improved display apparatus includes at least two elongated frame members arranged with ends thereof disposed generally adjacent one another in order to define an angulated frame corner configuration. Such frame members include elongated channel portions thereon, and an improved corner assembly according to the present invention includes a corner insert insertable between the generally adjacent ends of the frame members, and a corner key member for reinforcing and securely supporting the corner insert. The corner insert is attached to the corner key member, and the corner key member is attached to the frame members. The corner key member is preferably a continuous member, having a pair of corner legs disposed at an angulated relationship with one another, with each of the corner legs being receivable within the channel portion on one of the frame members and extending longitudinally therein.

In one form of the present invention, the corner insert is attached to the corner key member by way of a number of finger portions protruding from the corner insert for interlockingly engaging the corner key member. In another form of the present invention, the corner insert member includes at least one post member protruding therefrom and extending through a corresponding opening in the corner key member. In this form of the present invention, the corner insert member can also be formed as a two-piece member, with the post member being disposed on one of the two pieces and adapted to extend through the opening in the corner key member to be received within a complementary opening in the other piece of the two-piece corner insert. This allows the corner insert to hide its attachment to the corner key member from view and thereby allows the display apparatus to be attractive when viewed from either side.

In still another form of the present invention, which can be employed in combination with any of the features described above, the legs of the corner key member each include at least one barb portion protruding therefrom, with the barb portions grippingly and frictionally engaging the channel portions on the frame members when the corner legs are inserted therein. This arrangement, which can be used in combination with any of the arrangements discussed above, also contributes to the above-mentioned desired appearance of the display apparatus, wherein no fastening means are visible from either side of the display.

Additional objects, advantages and features of the present invention will become apparent from the following description and appended claims, taken in conjunction with the accompanying drawings.

BRIEF DESCRIPTION OF THE DRAWINGS

FIG. 1 illustrates a display apparatus of the type in which the present invention can be employed.

FIG. 2 illustrates a partial, exploded perspective view of a corner portion of the display apparatus in FIG. 1, employing a corner insert member of the prior art.

FIG. 3 is a partial elevational view of a corner portion of a display apparatus similar to that of FIGS. 1 and 2, but shown with one of the hinged frame member portions in its open position and employing a corner insert assembly according to the present invention.

FIG. 4 is a cross-sectional view taken generally along line 4—4 of FIG. 3.

FIG. 5 is a partial elevational detailed view, similar to that of FIG. 3, but illustrating another form of the corner insert assembly of the present invention.

FIG. 6 is a cross-sectional view taken generally along line 6—6 of FIG. 5.

FIG. 7 is a view similar to that of FIGS. 3 and 5, but illustrating still another form of a corner insert assembly according to the present invention.

FIG. 8 is a cross-sectional view taken generally along line 8—8 of FIG. 7.

FIG. 9 is a cross-sectional view taken generally along line 9—9 of FIG. 7.

DETAILED DESCRIPTION OF THE PREFERRED EMBODIMENTS

Figure 10:
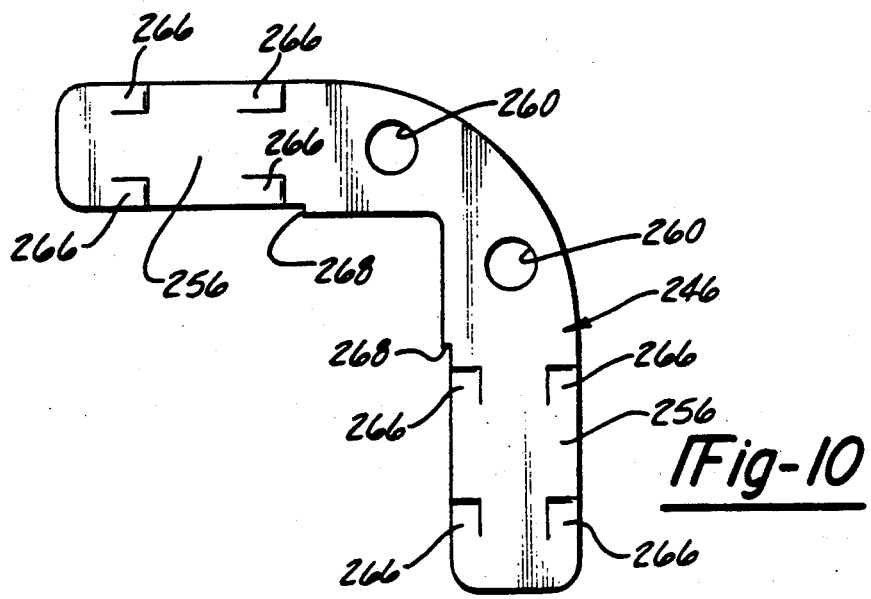
FIG. 10 illustrates another preferred form of the corner key member according to the present invention, which is shown primarily in connection with FIGS. 7 through 12, but which can also be used in combination with any of the embodiments shown in FIGS. 3 through 9.

The drawing figures herein illustrate various forms of a rounded or radiused corner insert assembly according to the present invention for use in connection with a display apparatus having a pair of frame members arranged with their ends adjacent one another to form an angulated corner. One skilled in the art will readily recognize from the following discussion, taken in conjunction with the drawing figures and the appended claims, that the principles of the present invention are equally applicable to corner insert assemblies other than the rounded or radiused corner arrangement shown in the drawings, as well as to display apparatuses other than that shown for purposes of illustration.

FIG. 1 illustrates a display apparatus 10, that is typical of one type of display apparatus in which the present invention can be used. Generally, the display apparatus 10 includes a number of elongated frame members 12, which function to retain and support a poster 14, or other such sign or display. In order to provide a desired aesthetic appearance, a rounded or radiused corner assembly 16 is included at the corner or intersection of adjacent frame members 12.

In FIG. 2, a display apparatus 20, which is generally similar to the display apparatus 10, includes a number of frame members 22, having a hinged or pivotal front portion 24 hingedly connected with a back portion 26, thus allowing the frame members 22 to be opened up for insertion or removal of a poster or other display material. The display material is in turn supported in a generally flat, planar configuration by a backing board 28.

The frame members 22 include channel portions 30, which can consist of merely a slot-type configuration, or of a slot defined by spaced-apart sides having further channel configurations thereon. Examples of these types of frame configuration are shown in the U.S. Patents mentioned above.

The illustrated prior art corner insert member 32 includes leg portions 34 protruding therefrom for insertion into the channel portions 30 of the frame members 22. Once the leg portions of the corner insert 32 are inserted into the channel portions 30, a fastener 38 can be installed to extend through openings 35 and 36 in the leg portions 34 and the back portion 26 of the frame member 22, thereby securing the leg portions 34, and thus the corner insert 32, to the frame members 32.

As discussed above, the leg portions 34 of the corner insert 32, which are typically integrally molded therewith from a plastic material, are frequently susceptible to frame misalignment, breakage or other damage in the event that the display apparatus 20 is dropped or otherwise roughly handled. Therefore, the present invention seeks to overcome these and other disadvantages as is illustrated by various exemplary embodiments of the present invention described below and shown for purposes of illustration in FIGS. 3 through 12.

In FIGS. 3 through 12, many elements of the constructions shown in FIGS. 5 through 12 are identical or substantially similar to those of FIGS. 3 and 4, either structurally or functionally. Therefore such identical or similar elements are identified in the drawings by similar or corresponding reference numerals, but with such numerals having various one-hundred or two-hundred prefixes, for example, in order to distinguish therebetween.

In FIGS. 3 and 4, a display apparatus 40 includes a replaceable corner insert assembly 42 in accordance with the present invention, which generally includes a preferably plastic or other molded corner insert member 40 and a preferably metal or otherwise rigid corner key member 46. The corner insert member 44 includes one or more finger portions 48 protruding therefrom. The finger portions 48 are adapted to be received by notches or cut-outs 50 formed in a central area of the corner key member 46, which is overlapped by the corner insert member 44. Preferably, the finger portions 48 also include barb portions 52, or other such discontinuities, for interlockingly engaging the corner key member 46 in a "snap on" relationship therewith. It should be noted that the notches 50 can alternately be eliminated if not deemed necessary in a given application. In such a case, the finger portions 48 and the barb portions 52 merely engage the sides of the central portion of the corner key member 46.

The corner key member 46 also includes a pair of legs 56, which are adapted to be longitudinally inserted into the channel portions 30 of the frame members 22. As shown in FIG. 3, the corner key member 46 is attached or secured to the frame members 22 by way of openings 58 formed in the leg portions 56 in order to allow for insertion of any of a number of known fasteners. As is discussed below, other means for securely attaching the corner legs 56 to the frame members 22 without such fasteners can also be used.

FIGS. 5 and 6 illustrate another form of the present invention, wherein the one-piece corner insert member 44 of FIGS. 3 and 4 is replaced by a two-piece corner insert having two insert halves 144A and 144B. The corner key member 146 shown in FIGS. 5 and 6 preferably includes one or more openings 160 between the leg portions 156 for receiving a post portion 162 formed on one or the other of the insert halves 144A or 144B extending therethrough and further received within a hollow post or other such opening 164 in the other of the insert halves 144A or 144B.

Preferably, one or both of the post portion 162 and the hollow post or opening 164 is formed in a tapered configuration such that as the post portion 162 is forcibly inserted into the hollow post or opening 164, the clearance therebetween decreases in order to form a tight, force-fit relationship therebetween. This arrangement, with the corner key member 146 extending continuously between the insert halves 144A and 144B, and with the post portion 162 extending therethrough, securely attaches the corner insert assembly 142 to the corner key member 146, without the need for a visible fastener or finger portion such as those described above in connection with FIGS. 3 and 4. However, in a manner similar to that of the embodiment of the present invention shown in FIGS. 3 and 4, the corner insert members 44 or insert halves 144A and 144B can be easily replaced in the event that breakage or physical damage occurs which would detract from the appearance or function of the display apparatus.

FIGS. 7 through 12 illustrate still another form of the present invention, wherein an alternate but preferred arrangement is employed for securely attaching the corner key member to the frame members. In this regard, it should be noted that the arrangement shown in FIGS. 7 and 12 can be employed with any of the embodiments of the present invention, including those shown for purposes of illustration in FIGS. 3 and 4 and in FIGS. 5 and 6.

In FIGS. 7 through 12, a corner key member 246 is shown, which includes one or more barb portions 266 formed in the leg portions 256 of the corner key member 246. Such barb portions 266 are formed in a generally tapered or sloped configuration, perhaps best seen in FIGS. 11 and 12, in order to allow for relatively easy insertion of the leg portions 256 in the channel portions 230 (or channel portions 30 or 130) of the frame members 222. Once the leg portions 256 have been inserted into the channel portions 230, the barb portions 266 grippingly engage the channel portions 230 and forcibly resist removal of the leg portions 256 from within the channel portions 230, thereby securely attaching the corner key member 246 to the frame members 222.

Figure 11:
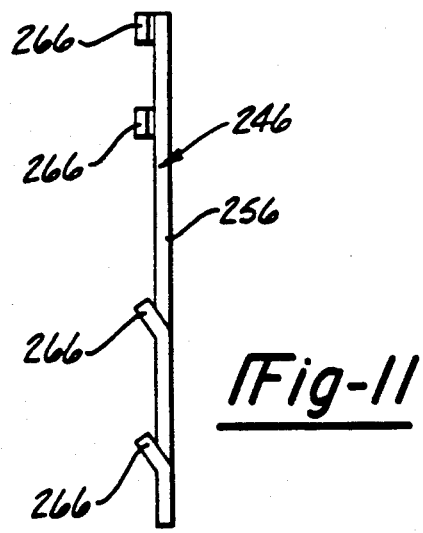
FIG. 11 is a side view of the corner key member of FIG. 10.
Figure 12:
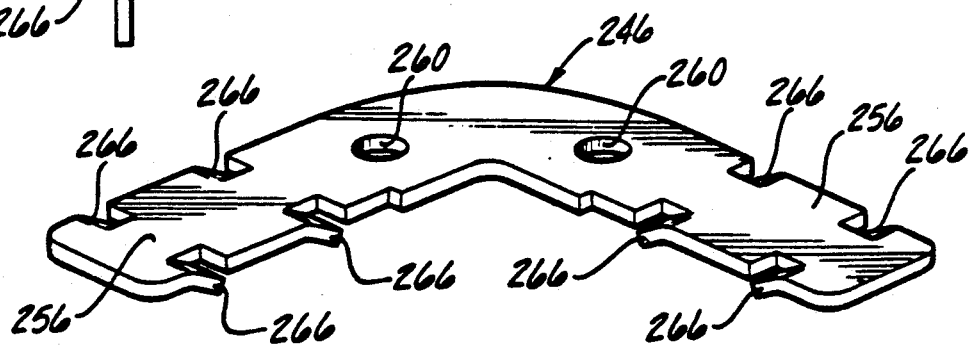
FIG. 12 is a perspective view of the corner key member of FIGS. 10 and 11.

The arrangement shown in FIGS. 10 through 12 is especially advantageous in the exemplary version of the display apparatus shown in FIGS. 7 through 9, in which a display apparatus is specially adapted for displaying a message from either side of the structure. Thus, since the corner key member 246 is retained in a secure attachment with the frame member 222 by means of the barb portions 266, which are disposed wholly within the channel portions 230, no fasteners are visible or present to detract from the appearance of the display structure or to prevent the "back-to-back" configuration of the two-sided arrangement shown in FIGS. 7 through 8. In this regard, it should also be noted that the corner insert member halves 244A and 244B are preferably symmetrical with respect to their outer peripheral shape, differing only internally with respect to the post portion 262 and the hollow post or opening 264.

Furthermore, the corner key member 246 shown for purposes of illustration in FIGS. 7 through 12 also preferably includes a stepped portion forming a stop 268 on each of the leg portions 256. Such step or stop 268 limits the longitudinal insertion of the legs 256 into the channel portions 230 of the frame members 222, thereby facilitating the ease of alignment of the frame members 222 and thus eliminating or at least minimizing unsightly gaps between the corner insert member 244 and the ends of the frame members 222.

The stop 268 also protects against damage to the corner insert member 242 in the event of impact. The stop 268 thus prevents the corner insert members 242 from being forced against the frame members 222 as a result of such impact. Furthermore, it should be noted that a stop such as the stop 268 can also optionally be included in any of the other embodiments of the invention, such as those shown in FIGS. 3 through 6 and discussed above.

It should be noted that the configuration for the corner key member 246 shown in FIGS. 7 through 12, including the barbs 266, the stops 268, or both, can alternately be employed in conjunction with the corner insert member arrangements shown in FIGS. 3 and 4 and in FIGS. 5 and 6. Further in this regard, as one skilled in the art will now readily recognize, the corner insert member in any of the embodiments of the invention shown and described herein can alternately be integrally molded onto its respective corner key member, thereby eliminating the need for the various corner insert member attachment arrangements shown above. However, if the corner insert member is integrally molded onto the corner key member, breakage or other physical damage to the corner insert member would require replacement of the entire corner insert assembly, including the corner insert and the corner key member, rather than merely requiring replacement of only the corner insert member (or the corner insert halves) described above in connection with the illustrated embodiments of the present invention.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

We claim:

1. In a display apparatus having at least two elongated frame members arranged with ends thereof disgated generally adjacent one another to define an angulated frame corner configuration with the frame members having elongated channel portions thereon, an improved corner assembly comprising:

a corner insert insertable between the generally adjacent ends of the frame members, said corner insert including a pair of insert halves, one of said insert halves having at least one post member protruding therefrom, the other of said insert halves having at least one opening formed therein for receiving said post member therein;

a corner key member extending continuously between the frame members, said corner key member having a pair of elongated corner legs extending therefrom in an angulated relationship with one another, each of said corner legs being receivable within the channel portion on one of the frame members and extending longitudinally therein, said corner key member further having at least one opening formed therethrough for receiving said post member extending therethrough, said corner key member extending continuously between said insert halves; and key attachment means for securing said corner legs to the frame members.

2. The improvement according to claim 1, wherein at least a portion of said post member is tapered inwardly toward its free end, said opening formed in said other insert half being sized to receive said tapered post member in a force-fit relationship therein.

3. The improvement according to claim 1, wherein said key attachment means includes at least one leg barb portion protruding from each of said corner legs, said leg barb portions grippingly engaging the channel portions on the frame members when said corner legs are received therein and tending to restrain said corner legs from removal from the channel portions.

4. The improvement according to claim 3, wherein said corner key member includes stop means for limiting the longitudinal insertion of said corner legs into the channel portions on the frame members.

5. The improvement according to claim 1, wherein said key attachment means includes at least one fastener means for securing said corner legs to the frame members.

6. The improvement according to claim 1, wherein said corner insert is composed of a molded plastic, and said corner key member is composed of a metal material.

7. The improvement according to claim 1, wherein a portion of said corner insert member has a rounded configuration such that said corner assembly forms a radiused corner configuration for said display apparatus.

8. In a display apparatus having at least two elongated frame members arranged with ends thereof disposed generally adjacent one another to define an angulated frame corner configuration with the frame members having elongated channel portions thereon, an improved corner assembly comprising: a corner insert insertable between the generally adjacent ends of the frame members; a corner key member extending between the frame members for reinforcing and supporting said corner insert; insert attachment means for securing said corner insert to said corner key member; and key attachment means for securing said corner key member to the frame members, said corner key member being continuous and having a pair of corner legs disposed at an angulated relationship with one another with each of said corner legs being insertably receivable within the channel portion of one of the frame members and extending longitudinally therein, said insert attachment means having a number of finger portions protruding laterally from said corner insert, and a corresponding number of notches formed in opposed edges of said corner key member for interlockingly receiving said finger portions in a lateral direction in order to secure said corner insert to said corner key member in an alignment maintained by the finger portions.

9. In a display apparatus having at least two elongated frame members arranged with ends thereof disposed generally adjacent one another to define an angulated frame corner configuration with the frame members having elongated channel portions thereon, an improved corner assembly comprising: a corner insert insertable between the generally adjacent ends of the frame members; a corner key member extending between the frame members for reinforcing and supporting said corner insert; insert attachment means for securing said corner insert to said corner key member; and key attachment means for securing said corner key member to the frame members, said corner key member being continuous and having a pair of corner legs disposed at an angulated relationship with one another with each of said corner legs being insertably receivable within the channel portion of one of the frame members and extending longitudinally therein, said insert attachment means having at least one post member protruding from said corner insert and having a free end, and said corner key member having at least one opening formed therethrough for receiving said post member extending therethrough.

10. The display apparatus as set forth in claim 9 wherein said corner insert comprises a first member and a second member, said first member having said post member thereon and said second member having socket means for securely holding said free end of said post member extending through said key member.

11. The improvement according to claim 9, wherein said key attachment means includes at least one leg barb portion protruding from each of said corner legs, said leg barb portions grippingly engaging the channel portions on the frame members when said corner legs are received therein and tending to restrain said corner legs from removal from the channel portions.

12. The improvement according to claim 9, wherein said corner insert includes a pair of insert halves, one of said insert halves having said post member thereon, and the other of said insert halves having at least one opening formed therein for receiving said post member extending through said opening in said corner key member with said corner key member extending continuously between said insert halves.

13. The improvement according to claim 12, wherein at least a portion of said post member is tapered inwardly toward its free end, said opening formed in said other insert half being sized to receive said tapered post member in a force-fit relationship therein.

14. The improvement according to claim 13, wherein said key attachment means includes at least one leg barb portion protruding from each of said corner legs, said leg barb portions grippingly engaging the channel portions on the frame members when said corner legs are received therein and tending to restrain said corner legs from removal from the channel portions.

15. The improvement according to claim 9, wherein said corner key member includes stop means for limiting the longitudinal insertion of said corner legs into the channel portions on the frame members.

16. The improvement according to claim 9, wherein said corner insert is composed of a molded plastic, and said corner key member is composed of a metal material.

17. The improvement according to claim 9, wherein a portion of said corner insert member has a rounded configuration such that said corner assembly forms a radiused corner configuration for said display apparatus.

18. The improvement according to claim 8, wherein said finger portions include finger barb portions thereon, said finger barb portions interlockingly engaging said corner key member when said finger portions are received in said notches in said corner key member.

19. The improvement according to claim 8, wherein said key attachment means includes at least one leg barb portion protruding from each of said corner legs, said leg barb portions grippingly engaging the channel portions on the frame members when said corner legs are received therein and tending to restrain said corner legs from removal from the channel portions.

20. A corner assembly for a display apparatus, said corner assembly adapted to be disposed adjacent the ends of two adjacent elongated frame members to form a continuous frame structure around the corner of the display apparatus, said corner assembly comprising:
 a) attachment means for securely holding said corner assembly in position between said adjacent frame members, said attachment means having end members insertable within each of said adjacent frame members, and having at least one opening therein,
 b) first corner portion having at least one post member protruding thereon, said post member having a free end, and
 c) second corner portion having at least one socket means thereon for mating with said free end of said post member,
 d) whereby said first and second corner portions are securely assembled around said attachment means with said post member extending through said opening and into said socket member.

21. The corner assembly as set forth in claim 20 wherein said attachment means includes barbed portions protruding from said end members in order to securely grip and hold together said corner assembly with said frame members.

22. The corner assembly as set forth in claim 21 wherein said frame members have channel means therein and said end members are grippingly engaged in said channel means.

23. The corner assembly as set forth in claim 20 wherein said first corner portion has two post members, said second corner portion has two corresponding socket means and said attachment means has two openings positioned for passage therethrough of said post members.

24. The corner assembly as set forth in claim 20 wherein said corner insert comprises a curved profile to form a round corner mating and engaging with the two adjacent frame members.

25. The corner assembly as set forth in claim 20 wherein four of said corner assemblies and four elongated frame members are provided to form a continuous frame structure around the periphery of said display apparatus.

26. The corner assembly as set forth in claim 20 wherein said each of said first and second corner portions have one post member and one socket means thereon, and said attachment means has two openings therein, whereby said post member on said first corner member is received into said socket means on said second corner member, and said post member on said second corner member is received into said socket means on said first corner member.

27. The corner assembly as set forth in claim 20 wherein said attachment means includes stop means for limiting the longitudinal insertion of said end members into the frame members.

28. In a display apparatus having at least two elongated frame members arranged with ends thereof disposed generally adjacent one another to define an angulated frame corner configuration with each of the frame members having therein a pair of spaced-apart elongated channel portions opening generally toward one another thereon, an improved corner assembly comprising: a corner insert insertable between the generally adjacent ends of the frame members; a corner key member extending between the frame members for reinforcing and supporting said corner insert; insert attachment means for securing said corner insert to said corner key member; and key attachment means for securing said corner key member to the frame members, said corner key member being continuous and having a pair of elongated corner legs disposed at an angulated relationship with one another with each of said elongated corner legs being insertably receivable within the spaced-apart pair of channel portions of one of the frame members and extending longitudinally therein, said key attachment means including at least one leg barb portion disposed generally along each lateral edge of said elongated corner legs and protruding therefrom, each of said leg barb portions grippingly engaging one of the channel portions on one of the frame members when said elongated corner legs are received therein and tending to restrain said corner legs from removal from the spaced-apart channel portions, said insert attachment means including a number of finger portions protruding from said corner insert, said finger portions interlockingly engaging said corner key member in order to secure said corner insert to said corner key member, said corner key member including a corresponding number of notches formed therein for interlockingly receiving said finger portions.

29. In a display apparatus having at least two elongated frame members arranged with ends thereof disposed generally adjacent one another to define an angulated frame corner configuration with each of the frame members having therein a pair of spaced-apart elongated channel portions opening generally toward one another thereon, an improved corner assembly comprising:
a corner insert laterally insertable between the generally adjacent ends of the frame members, said corner insert having a number of finger portions protruding therefrom, said finger portions having discontinuities thereon;
a corner key member extending continuously between the frame members, said corner key member having a pair of elongated corner legs extending therefrom in an angulated relationship with one another, each of said elongated corner legs being insertably receivable within the spaced-apart pair of channel portions on one of the frame members and extending longitudinally therein, and said corner key member having a number of openings formed therein for receiving said finger portions therein; and
key attachment means for securing said corner legs to the frame members, said key attachment means including at least one leg barb portion protruding therefrom generally along each lateral edge of said elongated corner legs, each of said leg barb portions grippingly engaging one of the spaced-apart channel portions on one of the frame members when said elongated corner legs are received therein and tending to restrain said corner legs from removal from the spaced-apart channel portions,
said discontinuities on said finger portions of said corner insert interlockingly engaging said corner key member in a snap-on relationship therewith generally between the ends of the frame members in order to secure said corner insert to said corner key member.

30. In a display apparatus having at least two elongated frame members arranged with ends thereof disposed generally adjacent one another to define an angulated frame corner configuration with each of the frame members having therein a pair of spaced-apart elongated channel portions opening generally toward one another thereon, an improved corner assembly comprising:
a corner insert insertable between the generally adjacent ends of the frame members, said corner insert including a pair of insert halves, one of said insert halves having at least one post member protruding therefrom, the other of said insert halves having at least one opening formed therein for receiving said post member therein;
a corner key member extending continuously between the frame members, said corner key member having a pair of elongated corner legs extending therefrom in an angulated relationship with one another, each of said elongated corner legs being insertably receivable within the spaced-apart pair of channel portions on one of the frame members and extending longitudinally therein, said corner key member further having at least one opening formed therethrough for receiving said post member extending therethrough, said corner key member extending continuously between said insert halves; and key attachment means for securing said corner legs to the frame members, said key attachment means including at least one leg barb portion protruding therefrom generally along each lateral edge of said elongated corner legs, each of said leg barb portions grippingly engaging one of the spaced-apart channel portions on one of the frame members when said elongated corner legs are received therein and tending to restrain said corner legs from removal from the spaced-apart channel portions.

31. The improvement according to claim 30, wherein at least a portion of said post member is tapered inwardly toward its free end, said opening formed in said other insert half being sized to receive said tapered post member in a force-fit relationship therein.

32. The improvement according to claim 27, wherein said corner key member includes stop means for limiting the longitudinal insertion of said corner legs into the channel portions on the frame members.

33. In a display apparatus having at least two elongated frame members arranged with ends thereof disposed generally adjacent one another to define an angulated frame corner configuration with each of the frame members having therein a pair of spaced-apart elongated channel portions opening generally toward one another thereon, an improved corner assembly a corner insert laterally insertable between the generally adjacent ends of the frame members;

a corner key member extending continuously between the frame members, said corner key member having a pair of elongated corner legs extending therefrom in an angulated relationship with one another, each of said elongated corner legs being insertably receivable within the spaced-apart pair of channel portions on one of the frame members and extending longitudinally therein, each of said elongated corner legs having at least one leg barb portion disposed generally along each lateral edge thereof and protruding therefrom, each of said leg barb portions grippingly engaging the one of the spaced-apart channel portions on one of the frame members when said elongated corner legs are received therein and tending to restrain said elongated corner legs from removal from the spaced-apart channel portions and said corner key member having stop means for limiting the longitudinal insertion of said corner legs into the channel portions on the frame members; and insert attachment means for securing said corner insert to said corner key member.

* * * * *